US011886759B2

(12) United States Patent
Mantell et al.

(10) Patent No.: US 11,886,759 B2
(45) Date of Patent: *Jan. 30, 2024

(54) METHOD AND SYSTEM FOR OPERATING A METAL DROP EJECTING THREE-DIMENSIONAL (3D) OBJECT PRINTER TO COMPENSATE FOR DROP SIZE VARIATIONS

(71) Applicants: Xerox Corporation, Norwalk, CT (US); Palo Alto Research Center Incorporated, Palo Alto, CA (US)

(72) Inventors: David A. Mantell, Rochester, NY (US); Christopher T. Chungbin, Webster, NY (US); Daniel R. Cormier, Pittsford, NY (US); Scott J. Vader, Pittsford, NY (US); Zachary S. Vader, Pittsford, NY (US); Viktor Sukhotskiy, Amherst, NY (US); Raja Bala, Pittsford, NY (US); Walter Hsiao, San Mateo, CA (US)

(73) Assignee: Xerox Corporation, Norwalk, CT (US)

( * ) Notice: Subject to any disclaimer, the term of this patent is extended or adjusted under 35 U.S.C. 154(b) by 774 days.

This patent is subject to a terminal disclaimer.

(21) Appl. No.: 16/589,969

(22) Filed: Oct. 1, 2019

(65) Prior Publication Data
US 2021/0096537 A1    Apr. 1, 2021

(51) Int. Cl.
*G06F 3/12* (2006.01)
*B33Y 50/00* (2015.01)
(Continued)

(52) U.S. Cl.
CPC ........ *G06F 3/1208* (2013.01); *B22D 23/003* (2013.01); *B22F 10/22* (2021.01);
(Continued)

(58) Field of Classification Search
CPC ........ G05B 19/19; B33Y 50/00; B33Y 30/00; G06F 30/00; G06N 20/00
(Continued)

(56) References Cited

U.S. PATENT DOCUMENTS 9,616,494 B2    4/2017    Vader et al.
10,040,119 B2   8/2018    Vader et al.
(Continued)

OTHER PUBLICATIONS

European Search Report corresponding to European Patent Application No. 20 19 7617 (7 pages).

*Primary Examiner* — Md Azad
(74) *Attorney, Agent, or Firm* — Maginot Moore & Beck LLP

(57) ABSTRACT

A method operates a three-dimensional (3D) metal object manufacturing system to compensate for displacement errors that occur during object formation. In the method, image data of a metal object being formed by the 3D metal object manufacturing system is generated prior to completion of the metal object and compared to original 3D object design data of the object to identify one or more displacement errors. For the displacement errors outside a predetermined difference range, the method modifies machine-ready instructions for forming metal object layers not yet formed to compensate for the identified displacement errors and operates the 3D metal object manufacturing system using the modified machine-ready instructions.

8 Claims, 2 Drawing Sheets

(51) Int. Cl.
*G06N 20/00* (2019.01)
*B22D 23/00* (2006.01)
*G05B 19/19* (2006.01)
*G05B 19/4099* (2006.01)
*B22F 10/22* (2021.01)
*B22F 12/90* (2021.01)
*B22F 10/31* (2021.01)
*B22F 10/85* (2021.01)
*B33Y 30/00* (2015.01)
*G06F 119/18* (2020.01)
*G06F 30/00* (2020.01)
*B22F 12/00* (2021.01)
*B22F 12/33* (2021.01)
*B22F 10/32* (2021.01)

(52) U.S. Cl.
CPC ........... *B22F 10/31* (2021.01); *B22F 10/85* (2021.01); *B22F 12/90* (2021.01); *B33Y 50/00* (2014.12); *G05B 19/19* (2013.01); *G05B 19/4099* (2013.01); *G06N 20/00* (2019.01); *B22F 10/32* (2021.01); *B22F 12/222* (2021.01); *B22F 12/224* (2021.01); *B22F 12/33* (2021.01); *B33Y 30/00* (2014.12); *G05B 2219/35134* (2013.01); *G05B 2219/49007* (2013.01); *G06F 30/00* (2020.01); *G06F 2119/18* (2020.01)

(58) Field of Classification Search
USPC .......................................................... 700/98
See application file for complete search history.

(56) References Cited

U.S. PATENT DOCUMENTS

| | | | |
|---|---|---|---|
| 11,034,074 B2* | 6/2021 | Mandel | B29C 48/266 |
| 2016/0229125 A1* | 8/2016 | Bienzobas Saffie | B29C 64/209 |
| 2018/0297113 A1* | 10/2018 | Preston | B22F 10/10 |
| 2018/0297114 A1 | 10/2018 | Preston et al. | |
| 2018/0304540 A1* | 10/2018 | Tobia | B22F 3/1021 |
| 2019/0375003 A1* | 12/2019 | Mark | B22F 10/20 |
| 2019/0381736 A1* | 12/2019 | Jensen | B22F 10/20 |
| 2020/0361155 A1* | 11/2020 | Jones | G06F 30/20 |

* cited by examiner

METHOD AND SYSTEM FOR OPERATING A METAL DROP EJECTING THREE-DIMENSIONAL (3D) OBJECT PRINTER TO COMPENSATE FOR DROP SIZE VARIATIONS

TECHNICAL FIELD

This disclosure is directed to liquid metal ejectors used in three-dimensional (3D) object printers and, more particularly, to operation of the ejectors to compensate for deviations in the size of the drops ejected by these ejectors.

BACKGROUND

Three-dimensional printing, also known as additive manufacturing, is a process of making a three-dimensional solid object from a digital model of virtually any shape. Many three-dimensional printing technologies use an additive process in which an additive manufacturing device forms successive layers of the part on top of previously deposited layers. Some of these technologies use ejectors that eject thermoplastic materials that are melted materials, such as ABS plastic. The printer typically operates one or more ejectors to form successive layers of the thermoplastic material that form a three-dimensional printed object with a variety of shapes and structures. After each layer of the three-dimensional printed object is formed, the thermoplastic material cools and hardens to bond the layer to an underlying layer of the three-dimensional printed object. This additive manufacturing method is distinguishable from traditional object-forming techniques, which mostly rely on the removal of material from a work piece by a subtractive process, such as cutting or drilling.

Recently, some 3D object printers have been developed that eject drops of liquid metal from one or more ejectors to form 3D objects. These printers have a source of solid metal, such as a roll of wire or pellets, that are fed into a heating chamber where they are melted and the liquid metal flows into a chamber of the ejector. The chamber is made of non-conductive material around which an uninsulated electrical wire is wrapped. An electrical current is passed through the conductor to produce an electromagnetic field that causes the meniscus of the liquid metal at a nozzle of the chamber to separate from the liquid metal within the chamber and be propelled from the nozzle. A platform opposite the nozzle of the ejector is moved in a X-Y plane parallel to the plane of the platform by a controller operating actuators to form layers of an object on the platform and another actuator is operated by the controller to alter the position of the ejector or platform in the vertical or Z direction to maintain a constant distance between the ejector and an uppermost layer of the object being formed.

During operation of such a printer, the volumes of the drops ejected from the ejector can be different than a nominal expected value. These drop variations cause all or a portion of a layer's height to be higher or lower than intended and as the layers with these errors are stacked on one another, this height error accumulates. Additionally, the drop spacings can be different under normal printing conditions for different portions of a part, such as, the interior, perimeters, overhangs, and bridges. Consequently, this changing frequency of drop ejection in different areas can cause some part features to be more severely affected than other part features and the errors in these features may be more difficult to correct than the overall part height error previously noted. Inconsistent flow of drops around edges, pillars, thin walls, and tight corners can also cause feature shape errors. Other drop misplacements can come from errors in the relative motion between the drops and the substrate and drop timing inconsistencies arising from control tuning, timing, or drop velocity variations. Another source of errors can come from inconsistent ejection of the drops. This inconsistency includes poor or varying directionality and potentially increasing production of unwanted satellite drops. These errors cause asymmetric height and geometry errors. Detection and compensation of these errors during the manufacturing process would be useful so the halting of the manufacturing process and the scrapping of the part can be avoided.

SUMMARY

A new method of operating a metal ejecting 3D object printer adjusts operation of the printer to compensate for ejection errors without having to halt the manufacturing process or scrapping the part. The method includes generating image data of a metal object being formed by the 3D metal object manufacturing system prior to completion of the metal object, comparing the generated image data of the metal object to original 3D object design data to identify a difference, identifying a displacement error as the identified difference when the identified difference is outside a predetermined difference range, modifying machine-ready instructions for forming metal object layers not yet formed to compensate for the identified displacement error, and operating the 3D metal object manufacturing system using the modified machine-ready instructions.

A new 3D metal object manufacturing system adjusts operation of the system to compensate for ejection errors without having to halt the manufacturing process or scrapping the part. The system includes an optical sensor configured to generate image data of a metal object being formed by the 3D metal object manufacturing system prior to completion of the metal object and a controller operatively connected to the optical sensor. The controller is configured to compare the generated image data of the metal object to original 3D object design data to identify a difference, identify a displacement error as the identified difference when the identified difference is outside a predetermined difference range, modify machine-ready instructions for forming metal object layers not yet formed to compensate for the identified displacement error, and operate the 3D metal object manufacturing system using the modified machine-ready instructions.

BRIEF DESCRIPTION OF THE DRAWINGS

The foregoing aspects and other features of operating a metal ejecting 3D object printer to adjust operation of the printer so ejection errors are compensated without having to halt the manufacturing process or scrapping the part are explained in the following description, taken in connection with the accompanying drawings.

DETAILED DESCRIPTION

Figure 1:
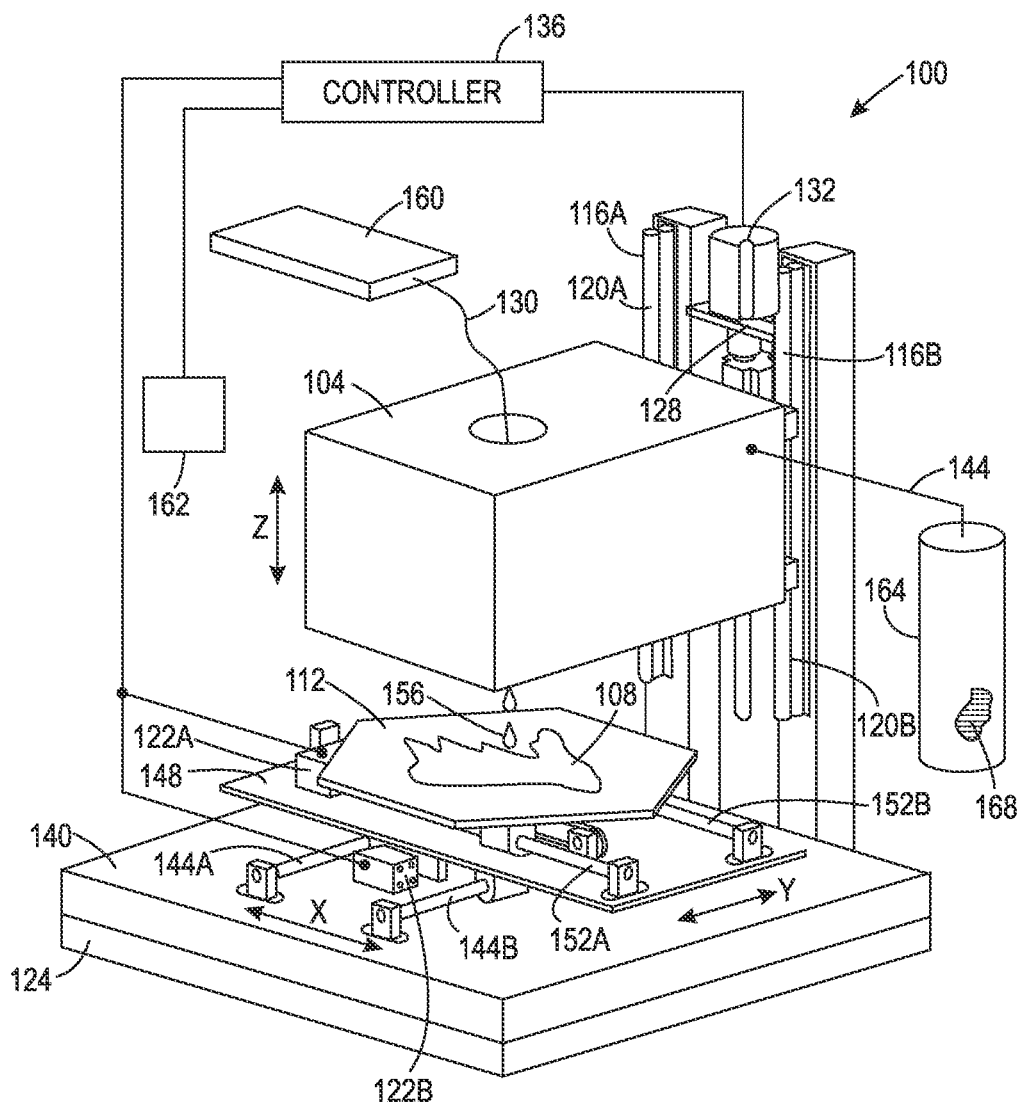
FIG. 1 depicts an additive manufacturing system that operates a liquid metal drop ejector to compensate for ejection errors during the part manufacturing process.

For a general understanding of the environment for the device disclosed herein as well as the details for the device, reference is made to the drawings. In the drawings, like reference numerals designate like elements.

FIG. 1 illustrates an embodiment of a liquid metal 3D object printer 100 that compensates for ejection errors during manufacture of an object. In this embodiment, drops of liquid metal are ejected from a printhead 104 and these drops form a three-dimensional metal object 108 on a platform 112. A source of metal 160 feeds metal in a form, such as metal wire 130, that is melted within printhead 104 to provide liquid metal for a chamber within the printhead. An inert gas supply 164 provides a pressure regulated source of an inert gas 168, such as argon, to the melted metal in the printhead 104 through a gas supply tube 144 to prevent the formation of aluminum oxide in the printhead.

The printhead 104 is movably mounted within z-axis tracks 116A and 116B in a pair of vertically oriented members 120A and 120B, respectively. Members 120A and 120B are connected at one end to one side of a frame 124 and at another end to one another by a horizontal member 128. Vertical actuator 132 is mounted to the horizontal member 128 and operatively connected to the printhead 104 to move the printhead along the z-axis tracks 116A and 116B. The vertical actuator 132 is operated by a controller 136 to maintain a predetermined distance between one or more nozzles (not shown in FIG. 1) of the printhead 104 and an uppermost surface of the object 108 on the platform 112.

Mounted to the frame 124 is a planar member 140, which can be formed of granite or other sturdy material to provide reliably solid support for movement of the platform 112. Platform 112 is affixed to X-axis tracks 144A and 144B so the platform 112 can move bidirectionally along an X-axis as shown in the figure. The x-axis tracks 144A and 144B are affixed to a stage 148 and stage 148 is affixed to Y-axis tracks 152A and 152B so the stage 148 can move bidirectionally along a Y-axis as shown in the figure. Platform actuator 122A is operatively connected to the platform 112 and stage actuator 122B is operatively connected to the stage 148. Controller 136 operates the platform actuator 122A and the stage actuator 122B to move the platform along the X-axis and to move the stage 148 along the Y-axis to move the platform in an X-Y plane that is opposite the printhead 104. Performing this X-Y planar movement of platform 112 as drops of molten metal 156 are ejected toward the platform 112 forms a layer of the three-dimensional object 108. Controller 136 also operates vertical actuator 132 to adjust the vertical distance between the printhead 104 and the most recently formed layer to enable formation of a next object layer. While the liquid metal 3D object printer 100 is depicted in FIG. 1 as being operated in a vertical orientation, other alternative orientations can be employed. Also, while the embodiment shown in FIG. 1 has a platform that moves in an X-Y plane and the printhead moves along the Z axis, other arrangements are possible. For example, the printhead 104 can be configured for movement in the X-Y plane and along the Z axis. Additionally, while the printhead 104 has only one nozzle, it is configured in other embodiments with multiple nozzles.

The controller 136 can be implemented with one or more general or specialized programmable processors that execute programmed instructions. The instructions and data required to perform the programmed functions can be stored in memory associated with the processors or controllers. The processors, their memories, and interface circuitry configure the controllers to perform the operations previously described as well as those described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits. During object formation, image data for an image to be produced are sent to the processor or processors for controller 136 from either a scanning system or an online or work station connection for processing and generation of the printhead control signals output to the printhead 104.

The controller 136 of the liquid metal 3D object printer 100 requires data from external sources to control the printer for object formation. In general, a three-dimensional model or other digital data model of the object to be formed is stored in a memory operatively connected to the controller 136, the controller can access through a server or the like a remote database in which the digital data model is stored, or a computer-readable medium in which the digital data model is stored can be selectively coupled to the controller 136 for access. The three-dimensional model or other digital data model can be used by the controller to generate machine-ready instructions for execution by the controller 136 to operate the components of the printer 100 and fabricate the object corresponding to the model. The generation of the machine-ready instructions can include the production of intermediate models, such as when a CAD model of the object is converted into an STL data model, or other polygonal mesh or other intermediate representation, which can in turn be processed to generate machine instructions, such as g-code for fabrication of the object by the printer. As used in this document, the term "machine-ready instructions" means computer language commands that are executed by a computer, microprocessor, or controller to operate components of a 3D metal object additive manufacturing system to form a metal object. The controller 136 executes the machine-ready instructions to control the ejection of the metal drops from the printhead 104, the positioning of stage 148 and the platform 112, as well as the distance between the printhead 104 and the uppermost layer of the object.

The effects of unwanted variation in one or more layers must be detected before compensation of the variation can occur. This detection requires that the size and shape of the 3D object being formed must be measured during the manufacturing process. For this purpose, one or more measurement devices 162 are operatively connected to the controller 136 and positioned to obtain image data of the object. The devices 162 can be various types of optical sensors such as two-dimensional image generating camera systems, one-dimensional line scanners when either the scanner or the part is moved relative to each other, or point sensors, which can be used for more limited, but fast measurements of various portions of a part. In some cases, captured video frames from one or more video cameras can be combined to detect part size and shape from various positions or angles. Specialized lighting techniques, such as structured light, can also be used with video construction to collect shape and size details. Lighting from various angles can also be helpful, especially for generating 3D information from shadows and reflections. These techniques have inherent tradeoffs between speed, accuracy, precision and relative amounts of useful information, and a combination of more than one type of measurement device and image data processing can be used for some applications of the compensation process and configuration of the printed object.

Once the shape and size of the object or features of the object are measured, they must be compared to the expected shape and size of the part. This comparison can be done by using various versions of the data corresponding to the part at various stages of the data processing. These various data stages include the original 3D object design, such as CAD data for the object, or a surface data format, such as an STL file. As used in this document, "original 3D object design data" means any collection of data that represents the structure of an object to be manufactured and from which machine-ready instructions are generated to operate a 3D metal object additive manufacturing system to form the metal object. The comparison can also be made between measured shape or size and a portion of the machine-ready instructions, such as the G-code for operating the printer. Use of the machine-ready instructions provide some advantages because the instructions represent the part as printed with an increased level of process detail, such as printing direction, layer number, and the like. By modifying the machine-ready instructions, subsequent layers are corrected more directly. Other versions of the ideal shape may be useful in cases where modifications in the part design are needed to compensate for some changes from what is expected in the print process, such as differences in line growth, which require regenerating the path for one or more of the printhead nozzles through one or more layers. The comparison of the shape and size measurements obtained from the image data of the object to the original 3D object design data or the machine-ready instructions identifies errors, such as vertical displacement errors. A vertical displacement error is compared to a predetermined difference range and, if the error is outside the difference range, the controller determines compensation required to bring the vertical displacement error into the predetermined difference range. As used in this document, the term "vertical displacement error" means a distance between a position in the original 3D object design data and its corresponding position in the image data of the object along the Z axis, which is the vertical axis that is normal to the X-Y plane of the object supporting platform.

Once the comparison is made, some amount of smoothing in the difference or error profile is needed to ensure that the compensation does not amplify noise or the textures expected from individual drops or lines of drops in the last printed layer. Known compensation schemes that simply add or subtract individual drops to subsequent layers are not effective in correcting the detected shape and size errors formed with a 3D metal object forming system. That is, the addition or subtraction of drops to subsequent layers is extremely local in scope whereas the detected shape errors are typically not local in scope. Furthermore, if the liquid metal drops are deposited outside of one of the normally used tool paths, they tend to sit on top of the previous layer as hemispherical shapes rather than being integrated into the previously printed layers. In some cases, after a number of subsequent layers, an added drop can produce voids in the part being manufactured rather than simply adding height.

In the printer 100, the controller 136 is configured with programmed instructions stored in a memory operatively connected to the controller and with appropriate components operatively connected to the controller so upon execution of the instructions, the controller detects errors caused by liquid metal drop variations and modifies machine-ready instructions to be executed by the controller to alter the drop spacing of a subsequent layer or layers. This drop spacing alteration can be done to achieve very fine variations in the metal mass deposited in all or portions of a layer or layers to compensate for errors in the heights of the printed layers. The drops resulting from the machine-ready instruction modifications are integrated into lines of drops and the lines are integrated into layers as part of the normal layer building process. Essentially, a significant advantage arises from the insertion of the altered metal mass in a semi-continuous manner because the almost continuous variability of the drop spacing and the process in which one molten drop lands next to a previously cooling drop forms a line of metal that is integrated into the layer as it is being formed. The drop spacing alteration also provides control over the lines of metal being printed adjacent, on top of, or nearby other previously printed lines to form layers or other structures, which is also advantageous. Where possible, the drop spacing alteration is done in a way that preserves the original tool path defined by the machine-ready instructions for a layer. Reducing or increasing drop spacings locally increases or decreases the drop mass, respectively. Also, the programmed printing speed can also be changed to preserve the nominal firing rate of the drops where applicable.

In one example of this type of machine-ready instruction modification to effect drop spacing changes, the originally produced G-code used for normal printing looks like the following and the comments for the instruction following the ";" character explain the results of the instruction:

G0 X0 Y0; move to location (0,0)
PULSE_DISTANCE=0.35; drop spacing 0.35 mm
PRINT_ON; Start printing
G1 Y100; print to new Y position (0,100) in a straight line
G1 X0.5; print to new X position (0.5, 100) in a straight line
G1 Y0; print to new Y position (0.5, 0) in a straight line
G1 X1; print to new X position (1,0) in a straight line
G1 Y100; print to new Y position (1,100) in a straight line
PRINT_OFF; stop printing Upon detection of an error caused by drop variation, compensation is implemented by adding an input to the G-code to control the drop spacing for each move or to break up some of the moves to change the drop spacing more continuously. An input can be added by including a parameter identified with the letter D to a G1 command followed by the drop spacing for the move. Alternatively, one parameter can be included for each start drop spacing and each end drop spacing, respectively. Modifying the code example given up in this manner produces a machine-ready instruction that replaces G1 Y100 with the following instruction: G1 Y100 D0.35,0.4, which results in printing to a new Y position (0,100) beginning with a drop spacing of 0.35 mm drop spacing and ending with a drop spacing of 0.4 mm. In one embodiment, the controller is configured with programmed instructions to identify a linear interpolation between the starting and ending drop spacings that is used along the printed line.

A controller configured as described above to execute modified G-code instruction can also adjust the velocity of motion to no more than a given maximum value during the printing of the line to preserve the firing frequency. Continuing the present example, the G-code is modified to include an instruction: G1 F3000, which causes the controller to operate an actuator to move the printhead at a constant speed of 50 mm/sec or 3000 mm/min. This instruction is used instead of: PRINT_FREQUENCY=400, which causes the controller to operate the actuator to accelerate and decelerate the movement of the printhead during programmed moves as drop spacing changes to preserve the firing frequency. The reader should note that acceleration and deceleration cause firing frequency changes under normal circumstances so this instruction does not force constant firing frequency as much as it prevents exceeding the intended firing frequency. Also, for sequential moves, the drop spacing between the last drop printed in the previous line printing and the first one for the next commanded G1 line printing instruction is a new drop spacing value regardless of the drop spacing identified in the previous G1 line printing instruction.

Altering the machine-ready instructions to compensate for a detected high portion in a region printed by the instructions in the example above provides:

PRINT_ON; start printing
G1 Y50 D0.35, 0.4; printing to a new Y position with drop spacing that starts at 0.35 mm and increases to 0.4 mm at end of the printing
G1 Y100 D0.4, 0.35; printing to a new Y position with drop spacing that is the reverse of the immediately previous instruction
G1 X0.5; printing to a new X position with drop spacing continuing at 0.35 mm
G1 Y50 D0.35, 0.4; printing to a new Y position with drop spacing that starts at 0.35 mm and increases to 0.4 mm at end of the printing
G1 Y0 D0.4, 0.35; printing to a new Y position with drop spacing that is the reverse of the immediately previous instruction
G1 X1; printing to a new X position with drop spacing continuing at 0.35 mm
G1 Y50 D0.35, 0.4; printing to a new Y position with drop spacing that starts at 0.35 mm and increases to 0.4 mm at end of the printing
G1 Y100 D0.4, 0.35; printing to a new Y position with drop spacing that is the reverse of the immediately previous instruction
PRINT_OFF; stop printing Printing moves can be broken down into smaller segments for more complicated changes in the contours of the object. These changes for implementing the correction can be provided in a map to the controller and the drop spacings in the instructions are modified as shown in the example above that use a linear function for the modifications. Alternatively, the instructions can implement changes to drop spacings for individual moves using non-linear functions rather than the linear functions discussed above. For example, polynomials, splines, and other algebraic functions or combinations of functions, such as absolute values, exponents, or logarithms can be used in the instructions. The drop spacings can be provided in move instructions and the instructions with their associated drop spacings can either be for one line, as in the linear example above, or for multiple lines to define both the function and the move. The function that defines the drop spacing can apply to a single move or to a series of moves. The map can be data of the modified layers, such as CAD or STL data, or as a series of shapes such as splines, Gaussian functions, or others. The map or shapes are associated with tool paths for forming the part and the modifications for the ejection of the metal drops are included in the tool paths provided for the part printing process.

A build error identified as a uniform variation from an intended height is caused by a difference in drop volume from the nominal drop volume. The additive manufacturing system can either measure the drop volume or determine the drop volume from the changes in height as the part is printed. The system stores both the current calculated drop volume or a value related to the drop volume and a correction value for the excess or deficit in the height of previously printed layers. The correction added for the subsequent layer can compensate for the entire variation or a portion of the measured difference for control stability. Changes in the drop spacings can be determined from a combination of the entire difference and a smaller portion of the difference. For example, drop spacing changes ca be determined from the following equation: $DS_i = DS_0 * (M_d/M_0 + f*C)$, where $M_0$ is the nominal drop mass, $M_d$ is the determined drop mass, $C$ is the entire measured difference, $DS_0$ is the nominal drop spacing, $DS_i$ is the drop spacing to use for the next layer, and $f$ is a factor for how much of the correction should be implemented at the $i^{th}$ layer. This type of correction adjustment for subsequent layers brings the part height to the intended layer height and ensures that layers printed subsequently are at the intended layer thickness. Monitoring the height of the part and detecting the change of height for subsequent layers continues so further modifications can occur throughout the part build.

In another variant, the relationship between the drop spacing correction ($DS_i, DS_0$) and part height error can be directly modeled via a machine learning approach. To accomplish this approach, a set of training examples of various levels of drop spacing plotted against printed part measurements at various layers is acquired offline. This data is used to train a regression, or more generally, a machine learning model, such as a support vector machine, random forest, or artificial neural network, which takes a layer number and part height error as inputs and predicts the required correction in drop spacing to be applied at a given layer.

For errors that cause variation across the surface of the part, corrections need to be made over a local layer area rather than across the entire layers of the part. The drop spacing changes from the height measurements obtained from subsequent layers of the remaining layers of the object. Typically, the printer combines drop spacing changes into the printing as a continuous function, changing drop spacing for each move or a series of moves in the tool path based on the height correction. This machine learning approach can be extended to include X and Y locations as additional inputs to the model during both training and real-time predictions.

The compensation alterations described above can be made over a plurality of layers to ensure a stable approach to the corrected value as long as enough layers remain to achieve the compensation. Additionally, the drop spacing changes can be limited to a range of drop spacings so artifacts are not produced in the printing process. Once corrective measures have been taken to adjust the part for the measured height difference, continued correction is needed to compensate for the drop volume estimated from the part height errors. Thus, corrections in drop spacing are continued in subsequent layers to correct for the drop volume variation preemptively.

Some types of errors require changes in the tool path of the printing. These tool path changes are most likely necessary at object perimeters or for support structures. That is, adjustments in the outside boundary dimensions of a layer along the X and Y axes typically require modifications to the tool path. These tool path edits are provided in modified machine-ready instructions supplied to the printer as they are needed to form a layer. The tool path along with any imbedded machine-ready instructions that change the drop spacings or along with an associated map or defined shape corrections are provided in a continuous manner or shortly before the beginning of the modified moves for the printing of a layer. Alternatively, references that identify locations or names in a storage device containing associated tool path data for unprinted paths, layers, or both can be provided to the controller so the controller can retrieve this data from the storage device. This data referenced by the locations or names can be populated as corrections are determined prior to the printing of layers that require the application of corrections.

An example of conditions requiring tool path changes in the X-Y plane occurs where a part changes shape along its height. If the thicknesses of sequential layers differ from the intended height of the layers then the changes in the shape of the object tend to occur at the height of a given layer rather than at the intended height of the part. Consequently, the tool path is altered to form the object with the intended shape at the actual height of the part rather than at the initial intended height of the printed layer. This tool path alteration is needed to reproduce the intended shape.

Figure 2:
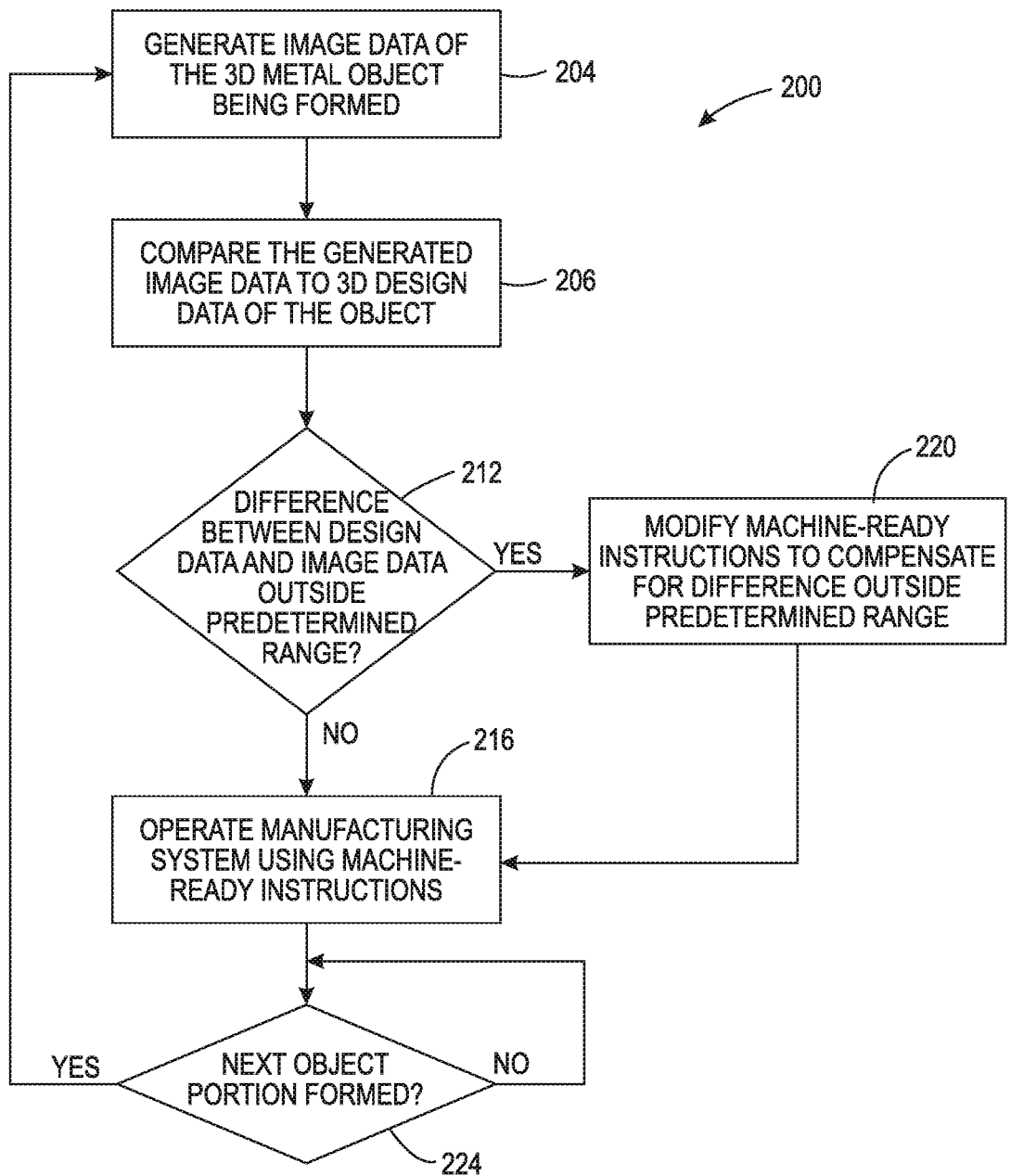
FIG. 2 is a flow diagram of a process used by the controllers of the additive manufacturing system of FIG. 1 to compensate for ejection errors during manufacture of a part.

A process for operating the printer shown in FIG. 1 is shown in FIG. 2. In the description of the process, statements that the process is performing some task or function refers to a controller or general purpose processor executing programmed instructions stored in non-transitory computer readable storage media operatively connected to the controller or processor to manipulate data or to operate one or more components in the printer to perform the task or function. The controller 136 noted above can be such a controller or processor. Alternatively, the controller can be implemented with more than one processor and associated circuitry and components, each of which is configured to form one or more tasks or functions described herein. Additionally, the steps of the method may be performed in any feasible chronological order, regardless of the order shown in the figures or the order in which the processing is described.

FIG. 2 is a flow diagram of a process 200 that operates the printing system 10 to compensate for displacement errors detecting during formation of a metal object by the system. The process begins with the generation of image data of the metal object being formed (block 204). The generated image data is compared to the 3D design data of the object that was used to produce the machine-ready instructions used to operate the system and form the object (block 208). If any dimensional differences between the 3D design data and the generated image data are outside of predetermined range (block 212), the machine-ready instructions are modified to compensate for the differences outside of the predetermined range (block 220). Otherwise, the machine-ready instructions originally generated are used to form another portion of the object (block 216). When the next portion of the object is formed (block 224), such as a layer or part feature, the process is repeated. The machine-ready instruction modifications are performed as described above.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A method for operating a three-dimensional (3D) metal object manufacturing system configured to eject melted metal drops comprising:
   generating image data of a metal object being formed by the melted metal drops ejected by the 3D metal object manufacturing system prior to completion of the metal object;
   comparing the generated image data of the metal object to original 3D object design data to identify a difference;
   identifying a displacement error as the identified difference when the identified difference is outside a predetermined difference range;
   modifying machine-ready instructions by changing drop spacing parameters identified in the machine-ready instructions for forming metal object layers not yet formed to compensate for the identified displacement error the drop spacing parameters being changed by using a linear function; and
   operating the 3D metal object manufacturing system using the modified machine-ready instructions.

2. A method for operating a three-dimensional (3D) metal object manufacturing system configured to eject melted metal drops comprising:
   generating image data of a metal object being formed by the melted metal drops ejected by the 3D metal object manufacturing system prior to completion of the metal object;
   comparing the generated image data of the metal object to original 3D object design data to identify a difference;
   identifying a displacement error as the identified difference when the identified difference is outside a predetermined difference range;
   modifying machine-ready instructions by changing drop spacing parameters identified in the machine-ready instructions for forming metal object layers not yet formed to compensate for the identified displacement error the drop spacing parameters being changed by using a non-linear function; and
   operating the 3D metal object manufacturing system using the modified machine-ready instructions.

3. The method of claim 2 wherein the non-linear function is a spline function.

4. A method for operating a three-dimensional (3D) metal object manufacturing system configured to eject melted metal drops comprising:
   generating image data of a metal object being formed by the melted metal drops ejected by the 3D metal object manufacturing system prior to completion of the metal object;
   comparing the generated image data of the metal object to original 3D object design data to identify a difference;
   identifying a displacement error as the identified difference when the identified difference is outside a predetermined difference range;
   modifying machine-ready instructions by changing drop spacing parameters identified in the machine-ready instructions for forming metal object layers not yet formed to compensate for the identified displacement error;
   setting a maximum frequency for drop firing within a layer;
   modifying a speed of movement for an ejector in the machine-ready instructions to ensure a frequency of ejection from the ejector does not exceed the maximum frequency; and
   operating the 3D metal object manufacturing system using the modified machine-ready instructions.

5. A three-dimensional (3D) metal object manufacturing system comprising:
   a printhead configured to eject drops of melted metal toward a platform;
   an optical sensor configured to generate image data of a metal object being formed by the 3D metal object manufacturing system on the platform prior to completion of the metal object; and a controller operatively connected to the optical sensor and the printhead, the controller being configured to:
compare the generated image data of the metal object to original 3D object design data to identify a difference;
identify a displacement error as the identified difference when the identified difference is outside a predetermined difference range;
modify machine-ready instructions by changing drop spacing parameters identified in the machine-ready instructions for forming metal object layers not yet formed to compensate for the identified displacement error, the drop spacing parameters being changed by using a linear function; and
operate the 3D metal object manufacturing system using the modified machine-ready instructions.

6. A three-dimensional (3D) metal object manufacturing system comprising:
a printhead configured to eject drops of melted metal toward a platform;
an optical sensor configured to generate image data of a metal object being formed by the 3D metal object manufacturing system on the platform prior to completion of the metal object; and
a controller operatively connected to the optical sensor and the printhead, the controller being configured to:
compare the generated image data of the metal object to original 3D object design data to identify a difference;
identify a displacement error as the identified difference when the identified difference is outside a predetermined difference range;
modify machine-ready instructions by changing drop spacing parameters identified in the machine-ready instructions for forming metal object layers not yet formed to compensate for the identified displacement error, the drop spacing parameters being changed by using a non-linear function; and
operate the 3D metal object manufacturing system using the modified machine-ready instructions;
change the drop spacing parameters using a non-linear function.

7. The system of claim 6 wherein the non-linear function is a spline function.

8. A three-dimensional (3D) metal object manufacturing system comprising:
a printhead configured to eject drops of melted metal toward a platform;
an optical sensor configured to generate image data of a metal object being formed by the 3D metal object manufacturing system on the platform prior to completion of the metal object; and
a controller operatively connected to the optical sensor and the printhead, the controller being configured to:
compare the generated image data of the metal object to original 3D object design data to identify a difference;
identify a displacement error as the identified difference when the identified difference is outside a predetermined difference range;
modify machine-ready instructions by changing drop spacing parameters identified in the machine-ready instructions for forming metal object layers not yet formed to compensate for the identified displacement error;
set a maximum frequency for drop firing within a layer; and
modify a speed of movement for the printhead in the machine-ready instructions to ensure a frequency of ejection from the printhead does not exceed the maximum frequency; and
operate the 3D metal object manufacturing system using the modified machine-ready instructions.

* * * * *